United States Patent
Wang et al.

(10) Patent No.: US 9,806,840 B2
(45) Date of Patent: Oct. 31, 2017

(54) TRANSMISSION SYSTEM AND METHOD USING MIXED MODULATION FORMATS

(71) Applicant: Tyco Electronics Subsea Communications LLC, Eatontown, NJ (US)

(72) Inventors: Hongsheng Wang, Bound Brook, NJ (US); Dmitriy Kovsh, Hoboken, NJ (US); Alexei N. Pilipetskii, Colts Neck, NJ (US)

(73) Assignee: TYCO ELECTRONICS SUBSEA COMMUNICATIONS LLC, Eatontown, NJ (US)

( * ) Notice: Subject to any disclaimer, the term of this patent is extended or adjusted under 35 U.S.C. 154(b) by 0 days.

(21) Appl. No.: 15/153,830

(22) Filed: May 13, 2016

(65) Prior Publication Data

US 2016/0337068 A1 Nov. 17, 2016

Related U.S. Application Data

(60) Provisional application No. 62/162,343, filed on May 15, 2015.

(51) Int. Cl.
*H04B 10/516* (2013.01)
*H04B 10/564* (2013.01)
*H04J 14/02* (2006.01)

(52) U.S. Cl.
CPC .......... *H04J 14/02* (2013.01); *H04B 10/5161* (2013.01); *H04B 10/564* (2013.01)

(58) Field of Classification Search
CPC .... H04B 10/564; H04B 10/5161; H04J 14/02

USPC .......................................................... 398/79
See application file for complete search history.

(56) References Cited

U.S. PATENT DOCUMENTS 9,553,695 B2 * 1/2017 Fujimori ............... H04L 1/0054
2016/0323039 A1 * 11/2016 Sun ..................... H04B 10/5161

OTHER PUBLICATIONS

Takahashi et al, "The Impact of the Combined 8-QAM and QPSK Subcarrier Modulation for Coherent Optical OFDM", Optical Society of Am.erica, OSA/OFC/NFOEC, 2011.*
Zhou et al., "12,000 km Transmission of 100GHz Spaced, 8 495-Gb/s PDM Time-DOmain Hybrid QPSK-8QAM Signals", Optical SOciety of America, OFC/NFOEC Techincal Digest, 2013.*

* cited by examiner

*Primary Examiner* — Dalzid Singh (57) ABSTRACT

A system and method for transmitting a wavelength division multiplexed (WDM) signal on an optical transmission path. The system includes at least one first modulation format transmitter configured to generate an associated first modulation format signal on an associated signal wavelength using a first modulation format having a first spectral efficiency, and at least one second modulation format transmitter configured to generate an associated second modulation format signal on an associated signal wavelength using a second modulation format having a second spectral efficiency higher than the first spectral efficiency. The second modulation format signals having an optical power set nominally higher than the optical power of the first modulation format signals. The first and second modulation format signals are combined into an aggregate output signal on the optical transmission path.

10 Claims, 5 Drawing Sheets

FIG. 6

TRANSMISSION SYSTEM AND METHOD USING MIXED MODULATION FORMATS

CROSS-REFERENCE TO RELATED APPLICATIONS

The present application claims the benefit of the filing date of U.S. Provisional Application Ser. No. 62/162,343, filed May 15, 2015, the teachings of which are hereby incorporated herein by reference.

TECHNICAL FIELD

The present disclosure relates to optical communication systems, and more specifically, to system and method using mixed modulation formats.

BACKGROUND

In wavelength division multiplexing (WDM) optical communication systems a single optical fiber may be used to carry multiple optical signals. The multiple optical signals are multiplexed to form a multiplexed signal or WDM signal with each of the multiple signals being modulated on separate channels. Each channel may be at an associated wavelength that is separated from adjacent channels by a defined channel-spacing, e.g. according to a channel plan established by the International Telecommunications Union (ITU). The entire range of wavelengths that may be transmitted on the system is known as the system bandwidth. Systems may utilize their system bandwidth to carry a desired number of channels with desired modulation format and bit rate.

To satisfy increasing demand for transmission capacity in optical transmission systems, spectral efficiency has been increased using a number of techniques. Multi-level modulation techniques and coherent receivers have been used, for example, to allow increased transmission rates and decreased channel spacing, thereby increasing the aggregate spectral efficiency (SE) of a WDM system. In a multi-level modulation format multiple data bits are encoded on a single transmitted symbol. For example, in quadrature amplitude modulation (QAM) formats, multiple bits-per-symbol may be represented using phase shift keying (PSK) with or without amplitude shift keying. In a quadrature phase-shift keying (QPSK) format, which may be referred to as 4QAM, four phases may be used without amplitude shift keying to represent two bits-per-symbol. An 8QAM format uses phase shift keying and amplitude shift keying to represent three bits-per-symbol and a 16QAM modulation format uses phase shift keying and amplitude shift keying to represent four bits-per-symbol. The spectral efficiency of a modulation format may be defined by number of bits-per-symbol (bits/symbol) encoded by the modulation format. An 8QAM format has a higher spectral efficiency (3 bits/symbol) than a QPSK format (2 bits/symbol).

While use of multi-level modulation formats may increase the overall spectral efficiency and transmission capacity of a system, formats having a higher spectral efficiency may exhibit a lower Q-factor at the same optical signal-to-noise ratio (OSNR) compared to formats having a lower spectral efficiency. For example, in an exemplary system including one-hundred ten spans of 60 km using ultra p-type fiber, if the repeater output power is limited to −4.1 dB per channel, a signal modulated using 8QAM may exhibit a Q-factor of about 4 dB lower than a signal modulated using QPSK. In such a system, achievable Q-factors for the 8QAM signal may not be sufficient to reliably meet system requirements when manufacturing imperfections, system aging and other performance impairments are taken into account. To achieve higher Q-factor for the 8QAM signal, higher OSNR may be required.

Operating with high OSNR may require high optical channel output power and high amplifier pump power, especially for wide system bandwidths. Delivering high power levels can present a significant technical and economic challenge, in particular, in undersea systems where the electrical power for the entire cable must be transported along the cable. In this scenario, the ability to realize increased performance may be impeded by a limited amount of available power.

BRIEF DESCRIPTION OF THE DRAWINGS

Reference should be made to the following detailed description which should be read in conjunction with the following figures, wherein like numerals represent like parts.

Although the following Detailed Description will proceed with reference being made to illustrative embodiments, many alternatives, modifications and variations thereof will be apparent to those skilled in the art.

DETAILED DESCRIPTION

This disclosure is directed to system and method using mixed modulation formats. Signals are modulated using at least two different modulation formats. One of the modulation formats provides a higher spectral efficiency (bits/symbol) than the other format. Signals modulated with the format having the higher spectral efficiency are provided with a higher OSNR than the signals modulated with the format having the lower spectral efficiency, and the signals modulated with the respective modulation formats may be spectrally interleaved.

Figure 1:
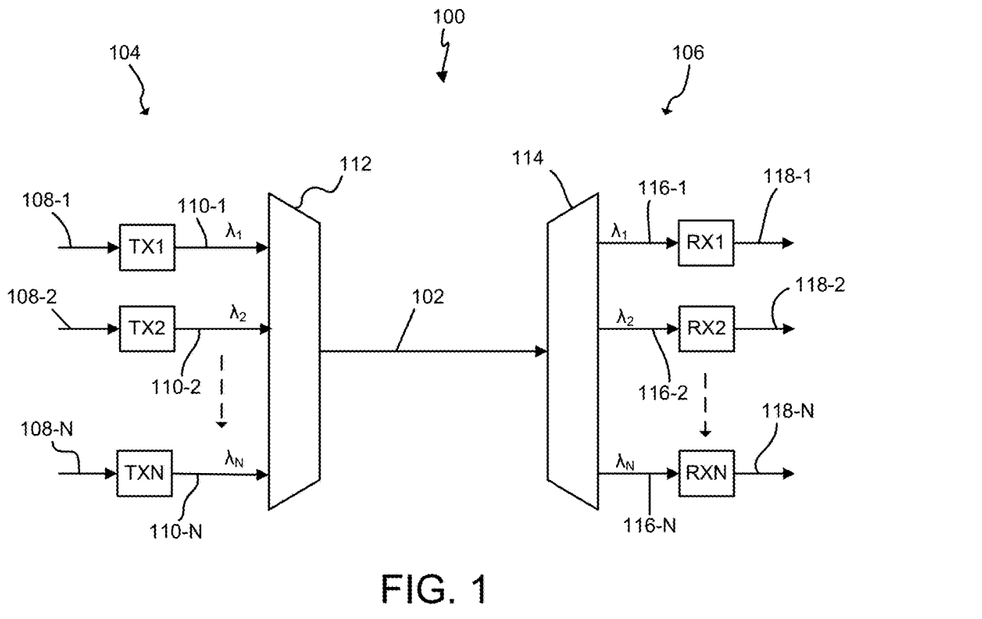
FIG. 1 is a block diagram of one exemplary embodiment of a system consistent with the present disclosure.

FIG. 1 is a simplified block diagram of one exemplary embodiment of a WDM transmission system 100 consistent with the present disclosure. The transmission system serves to transmit a plurality of optical channels over an optical information path 102 from a transmitting terminal 104 to one or more remotely located receiving terminals 106. The exemplary system 100 may be a long-haul submarine system configured for transmitting the channels from a transmitter to a receiver at a distance of 5,000 km, or more. Although exemplary embodiments are described in the context of an optical system and are useful in connection with a long-haul WDM optical system, the broad concepts discussed herein may be implemented in other communication systems transmitting and receiving other types of signals.

Those skilled in the art will recognize that the system 100 has been depicted as a highly simplified point-to-point system for ease of explanation. For example, the transmitting terminal 104 and receiving terminal 106 may, of course, both be configured as transceivers, whereby each may be configured to perform both transmitting and receiving functions. For ease of explanation, however, the terminals are depicted and described herein with respect to only a transmitting or receiving function. It is to be understood that a system and method consistent with the disclosure may be incorporated into a wide variety of network components and configurations. The illustrated exemplary embodiments herein are provided only by way of explanation, not of limitation.

In the illustrated exemplary embodiment, each of a plurality of transmitters TX1, TX2 . . . TXN receives a data signal on an associated input path 108-1, 108-2 . . . 108-N, and transmits the data signal on an associated wavelength $\lambda 1$, $\lambda 2$ . . . $\lambda N$ corresponding to defined data channels. Consistent with the present disclosure, one or more of the transmitters TX1, TX2 . . . TXN may be configured to modulate data using a first modulation format having a first spectral efficiency and one or more of the transmitters TX1, TX2 . . . TXN may be configured to modulate data using a second modulation format having a second spectral efficiency. The first and second modulation formats may be different multi-level modulation formats and have different spectral efficiencies. As will be discussed in greater detail herein, transmitters TX1, TX2 . . . TXN that transmit signals using the modulation format with the higher spectral efficiency may transmit the signals at a higher OSNR than the transmitters TX1, TX2 . . . TXN that transmit signals using the modulation format with the lower spectral efficiency. The transmitters TX1, TX2 . . . TXN are shown in highly simplified form for ease of explanation. Those skilled in the art will recognize that each transmitter TX1, TX2 . . . TXN may include electrical and optical components configured for transmitting the data signal at its associated wavelength with a desired amplitude and modulation.

The wavelengths or data channels from the transmitters TX1, TX2 . . . TXN are respectively carried on a plurality of paths 110-1, 110-2 . . . 110-N. The data channels are combined into an aggregate signal on optical path 102 by a multiplexer or combiner 112. The wavelengths associated with the data channels may be selected so that channels having first and second modulation formats are spectrally interleaved when combined into the aggregate signal by the multiplexer 112. For example, the wavelengths associated with the channels having the first and second modulation formats may be selected so that channels having the first and second modulation formats are spectrally interleaved on an alternating channel-by-channel basis in at least part of the system bandwidth or in one or more contiguous bands of channels having the first and second modulation formats. The optical information path 102 may include optical fiber waveguides, optical amplifiers, optical filters, dispersion compensating modules, and other active and passive components.

The aggregate signal may be received at one or more remote receiving terminals 106. A demultiplexer 114 separates the transmitted channels at wavelengths $\lambda 1$, $\lambda 2$ . . . kN onto associated paths 116-1, 116-2 . . . 116-N coupled to associated receivers RX1, RX2 . . . RXN. One or more of the receivers RX1, RX2 . . . RXN may be configured to demodulate the transmitted signal and may provide an associated output data signal on an associated output path 118-1, 118-2, 118-3, 118-N.

Figure 2:
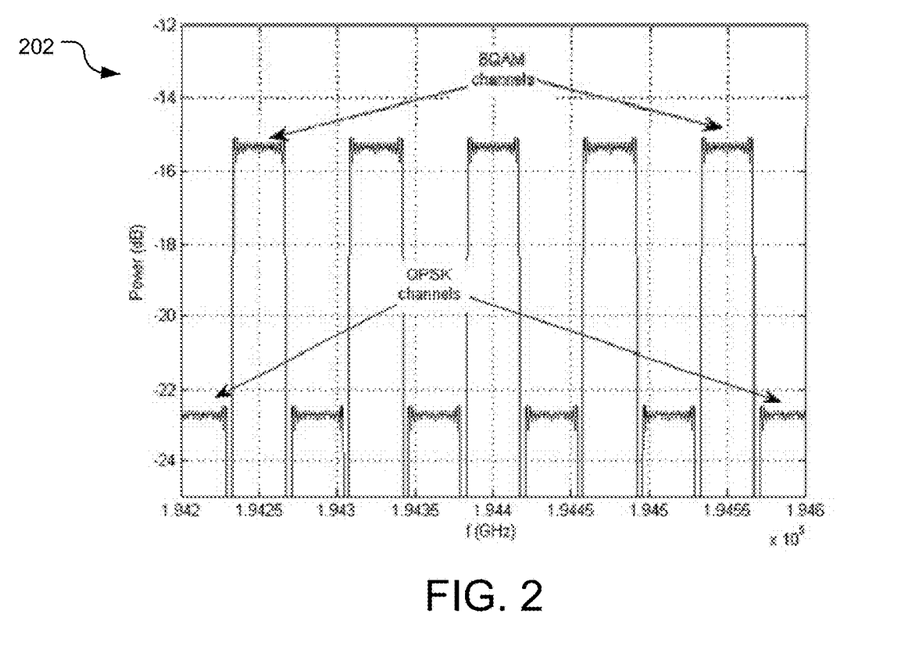
FIG. 2 includes a plot of power (dB) vs. frequency (GHz) illustrating one example of a system including mixed modulation formats consistent with the present disclosure.

FIG. 2 includes a plot 202 of power (dB) vs. frequency (GHz) illustrating a portion of the system bandwidth for one example of a system including mixed spectrally interleaved modulation formats consistent with the present disclosure. The illustrated exemplary embodiment includes six signals modulated with a QPSK format (labeled "QPSK channels") alternately interleaved on a channel-by-channel basis with five signals modulated with an 8QAM format (labeled "8QAM channels"). It is to be understood, however, that different numbers and arrangements of signals having different modulation formats may be provided in a system consistent with the present disclosure. For example, channels having lower spectral efficiency, e.g. QPSK signals in a QPSK/8QAM combination, may be placed more densely in parts of the system bandwidth with lower OSNR and performance, and channels having a higher spectral efficiency, e.g. 8QAM signals in a QPSK/8QAM combination, may be placed more densely toward wavelengths with a higher OSNR and performance. Also, in longer systems, e.g. of 10,000 km or more, the ratio of the signals modulated with the lower spectral efficiency format to the signals modulated with the higher spectral efficiency modulation format may be 2:1 or higher, whereas in shorter systems the ratio may be 1:2 or lower.

FIG. 2 and other example embodiments described herein may be described in connection with systems using QPSK and 8QAM formats. It is to be understood, however, that a system and method consistent with the present disclosure may use any combination of modulation formats, e.g. an 8QAM/16QAM combination. Also, a system consistent with the present disclosure may use more than two modulation formats. The specific type, number and placement of modulation formats used in a particular system consistent with the present disclosure may be determined based on achievable or desired system performance.

In FIG. 2, the channels with the lower spectral efficiency, i.e. the QPSK channels, have a reduced optical power compared to the optical power of the channels with the higher spectral efficiency, i.e. 8QAM channels. As the power of the channels with the lower spectral efficiency (the QPSK channels in the illustrated embodiment) decreases, their OSNR and Q-factors decrease. As the power of the channels with the higher spectral efficiency (the 8QAM channels in the illustrated embodiment) increases their OSNR and Q-factors increase. When the powers of the channels with the lower spectral efficiency decrease and the powers of the channels with the higher spectral efficiency increase, at some point their Q-factors equalize. The point at which the Q-factors of the channels with the lower spectral efficiency and the channels with the higher spectral efficiency equalize may be an optimal point for operation of the system.

Figure 3:
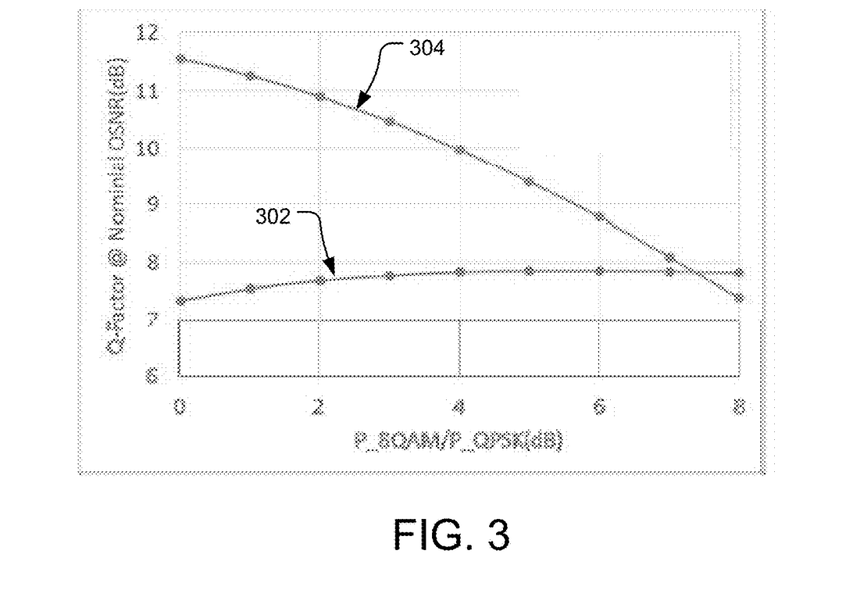
FIG. 3 includes plots of Q-factor (dB) vs. ratio of the power (dB) of an 8QAM signal to the power (dB) of a QPSK signal illustrating a power ratio at which the Q-factor for an 8QAM signal and a QPSK signal equalize in an example system consistent with the present disclosure.

FIG. 3, for example, includes plots 302, 304 of Q-factor (dB) vs. ratio of the power (dB) of an 8QAM signal to the power (dB) of a QPSK signal illustrating a power ratio at which the Q-factor for an 8QAM signal (plot 302) and a QPSK signal (plot 304) equalize in a system consistent with the present disclosure. In the illustrated example embodiment, when the ratio of the power of the 8QAM signal to the power of the QPSK signals is about 7.5, the Q-factors of the 8QAM signal and the QPSK signal equalize at about 7.9 dB. The transmitter design in a system consistent with the present disclosure may be configured to intentionally set the respective powers of the channels with the lower and higher spectral efficiencies, respectively, to nominally equalize the Q-factors of the channels. It is to be understood, however, systems and methods consistent with the present disclosure are not limited to systems and methods that set the respective powers of the lower and higher spectral efficiency channels to nominally equalize the Q-factors of the lower and higher spectral efficiency signals. The ratio of the respective powers of the lower and higher spectral efficiency channels may be determined by system length, available repeater power and desired performance characteristics. In one example of a system consistent with the present disclosure, the ratio of the respective powers (dB) of the lower and higher spectral efficiency signals may be nominally set to achieve any ratio required to achieve a desired performance for the lower and higher spectral efficiency channels.

Figure 4:
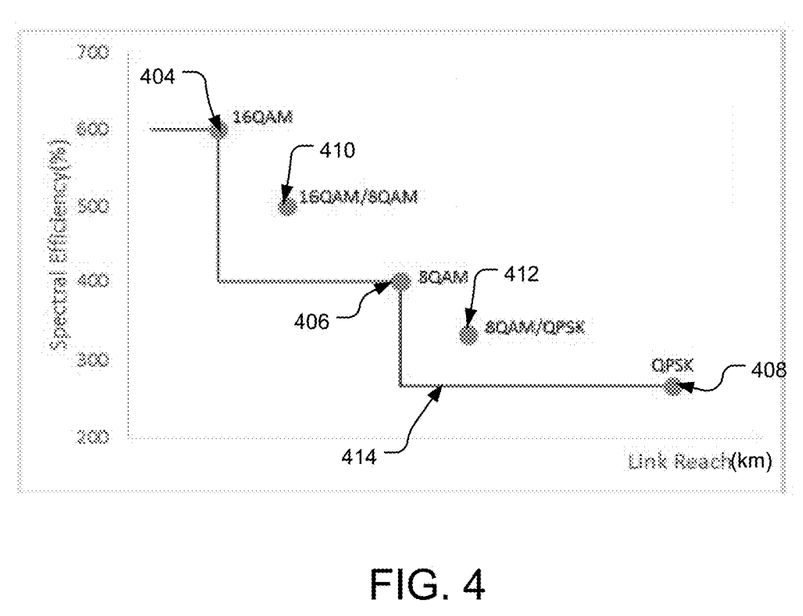
FIG. 4 includes plots of aggregate spectral efficiency (bit rate divided by the channel spacing) of an example transmission path vs hypothetical link reach (km) or path length illustrating performance of systems consistent with the present disclosure.

FIG. 4 includes a plot of aggregate spectral efficiency (bit rate divided by the channel spacing) for an example transmission path vs. hypothetical link reach (km) or path length illustrating performance of systems consistent with the present disclosure. In FIG. 4, points 404, 406, and 408 illustrate performance of known systems using 16QAM, 8QAM and QPSK, respectively. Points 410 and 412 illustrate performance of systems using a mixed spectrally interleaved 16QAM and 8QAM combination (16QAM/8QAM) and a mixed spectrally interleaved 8QAM/QPSK combination (8QAM/QPSK), respectively, consistent with the present disclosure. As shown by the line 414 connecting points 404, 406 and 408, without using a system or method consistent with the present disclosure, when the link reach slightly exceeds the maximum link reach for the modulation format (as limited by available power and performance requirements), the system should be designed with the next lower-order format (e.g. the system has to be redesigned to use 8QAM instead of 16QAM or QPSK instead of 8QAM). In the illustrated example embodiment, this reduces achievable spectral efficiency and system capacity by ⅓.

In a system consistent with the present disclosure, the choice of the ratio of the number of higher spectral efficiency channels to the number of lower spectral efficiency channels also affects the aggregate spectral efficiency of the system. In general, using more of the higher spectral efficiency channels increases the aggregate spectral efficiency of the system, but may reduce the achievable path length due to limitations in available power and performance requirements. Table 1 below illustrates achievable aggregate spectral efficiency (bit rate/channel spacing) in one example of a system consistent with the present disclosure:

TABLE 1

| 8QAM/QPSK Ratio | Aggregate Spectral Efficiency (%) |
|---|---|
| 1:0 | 400 |
| 3:1 | 367 |
| 2:1 | 356 |
| 1:1 | 333 |
| 1:2 | 311 |
| 1:3 | 300 |
| 0:1 | 267 |

In general, a method of designing a system consistent with the present disclosure may involve determining a repeater power, channel placement and relative power ratio of the higher and lower spectral efficiency modulation formats to be used in the system. The channel placement may be determined by system capacity requirements and the available system bandwidth.

Once the channel placement is set, the lower and higher modulation formats may be selected and the number of channels for each of the modulation formats may be fixed depending, for example, on the desired aggregate spectral efficiency of the system. For simplicity and ease of explanation, an example system configured to have an equal number of alternately spectrally interleaved 8QAM and QPSK signals on a 37.5 GHz channels spacing will be discussed. Although the discussion relates to a specific example, it is to be understood that a system consistent with the present disclosure may be implemented in any optical system configuration.

Figure 5A:
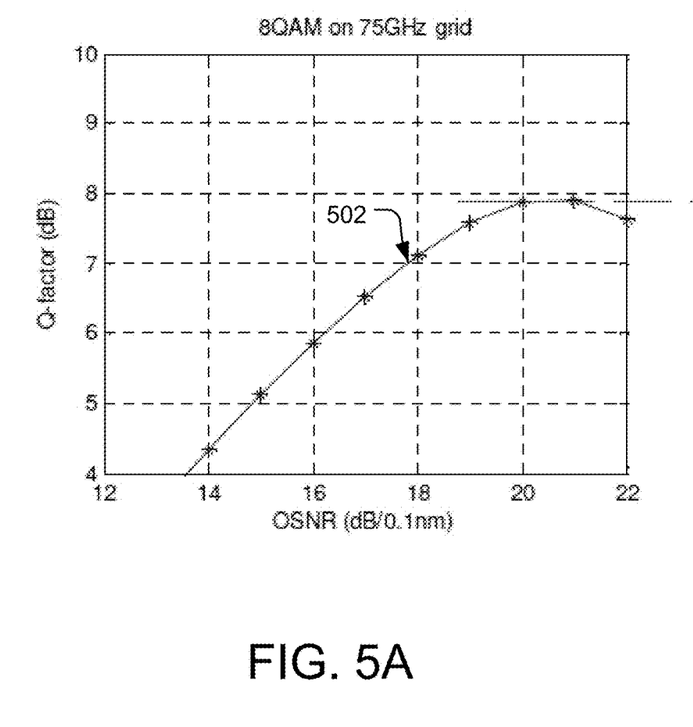
FIGS. 5A and 5B include plots of Q-factor (dB) vs. OSNR (db/0.1 nm) illustrating performance of 8QAM and QPSK modulated signals, respectively, on a 75 GHz grid, showing the respective OSNRs at which the Q-factors for the 8QAM signal and QPSK signals equalize in one example of a system consistent with the present disclosure.

In the example system, the performance of the 8QAM signals on a 75 GHz grid is determined without transmitting the QPSK signals. The peak Q-factor of associated with the 8QAM channels may determine the upper limit of the system performance in the example, assuming that Q-factors of the 8QAM and QPSK channels are nominally equalized in the example. FIG. 5A includes a plot 502 of Q-factor (dB) vs. OSNR (db/0.1 nm) illustrating performance of 8QAM signals on a 75 GHz grid (without the QPSK signals) for the example system. In embodiment shown in FIG. 5A, the peak Q-factor for the 8QAM channels is about 7.9 dB at an OSNR of about 20 dB/0.1 nm using a repeater power of about 18.3 dBm.

Figure 5B:
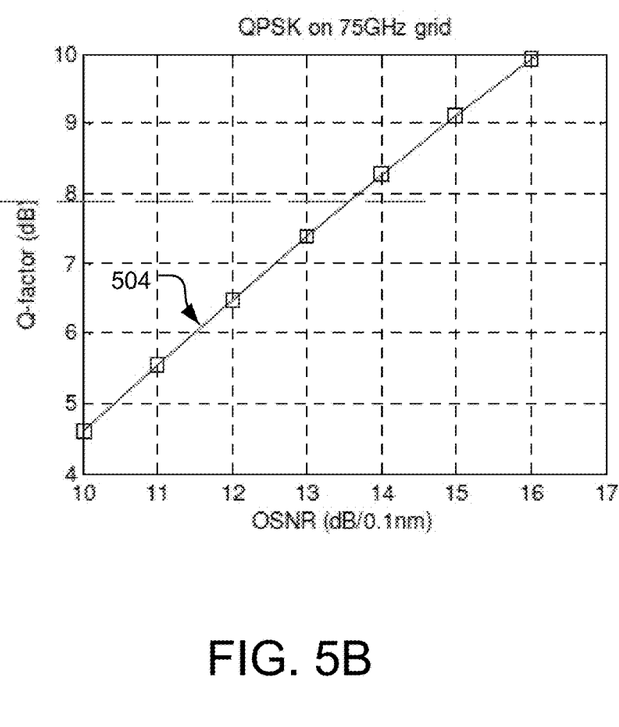

Once the peak Q-factor associated with the 8QAM channels is determined, the OSNR and repeater power to achieve the same Q-factor for the QPSK channels on a 75 GHz grid without the 8QAM channels is determined. FIG. 5B includes a plot 504 of Q-factor (dB) vs. OSNR (db/0.1 nm) illustrating performance of the QPSK signals on a 75 GHz grid (without the 8QAM signals) for the example system. As shown in FIG. 5B, the QPSK signals nominally achieve a 7.9 dB Q-factor (nominally the same as the peak Q-factor for the 8QAM signals) at an OSNR of about 13.6 dB/0.1 nm using a repeater power of about 11.3 dBm. Thus, the example system should have an initial design of at least 18.3 dBm repeater power, e.g. preferably about 19.1 dBm, and a power ratio of the 8QAM/QPSK signals of about 7 dB. The repeater power and channel power ratio may be optimized before combining the 8QAM and QPSK signals to take the interaction between neighboring channels into account. Although the example method described in connection with FIGS. 5A and 5B provides one method of designing a system consistent with the present disclosure, not all of the operations described may be necessary and it may not be necessary to perform them in the stated order.

Figure 6:
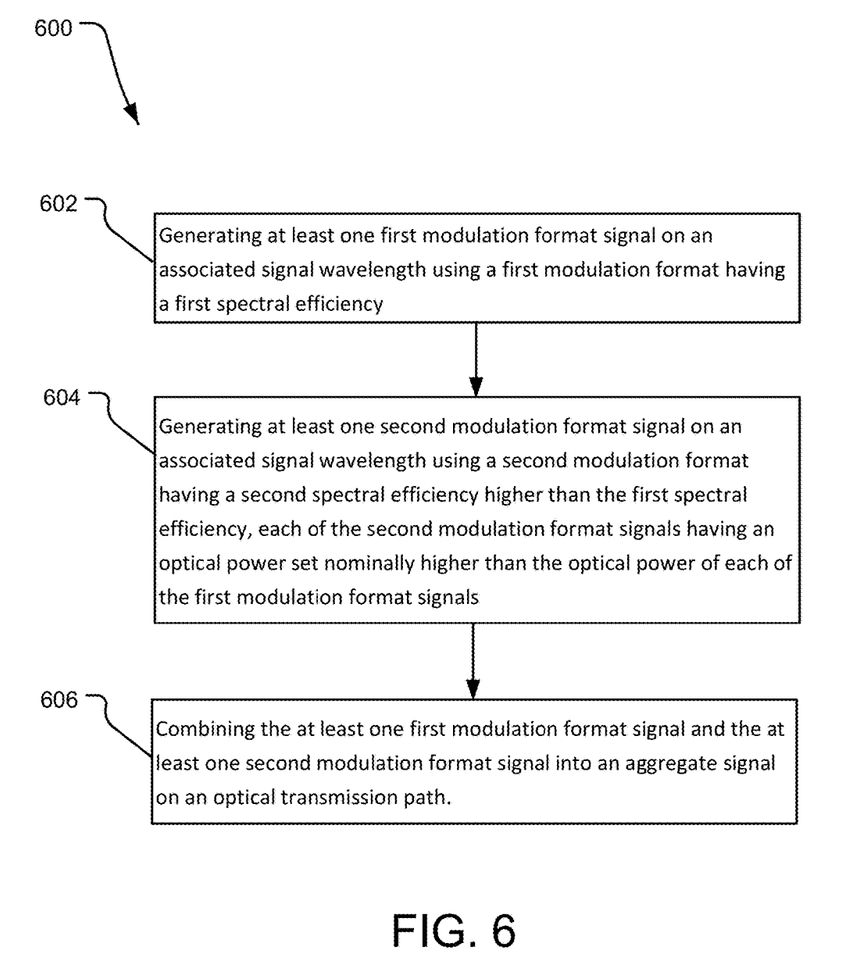
FIG. 6 is flow chart illustrating one example of a method consistent with the present disclosure.

FIG. 6 is a flow chart illustrating a method 600 consistent with the present disclosure. Operation 602 includes generating at least one first modulation format signal on an associated signal wavelength using a first modulation format having a first spectral efficiency. At least one second modulation format signal is generated 604 on an associated signal wavelength using a second modulation format having a second spectral efficiency higher than the first spectral efficiency. Each of the second modulation format signals has an optical power set nominally higher than the optical power of each of the first modulation format signals. In operation 606 the at least one first modulation format signal and the at least one second modulation format signal are combined into an aggregate signal on an optical transmission path.

While FIG. 6 illustrates various operations according to an embodiment, it is to be understood that not all of the operations depicted in FIG. 6 are necessary for other embodiments. Indeed, it is fully contemplated herein that in other embodiments of the present disclosure, the operations depicted in FIG. 6, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

Advantageously, a mixed spectrally interleaved system consistent with the present disclosure may be configured to increase system capacity for a given distance by adjusting the number, or ratio, of channels with the lower and higher spectral efficiencies. Alternatively, for a given system length, a system consistent with the present disclosure can achieve trade-off between aggregate spectral efficiency and performance margin (OSNR). A system and method consistent with the present disclosure may also be useful if not all manufacturing margin (available OSNR considering performance requirements) is consumed during system implementation and installation, thus excess margin becomes available. In a system consistent with the present disclosure, the available excess margin can be used to provide higher system capacity.

According to one aspect of the present disclosure there is provided a system including at least one first modulation format transmitter configured to generate an associated first modulation format signal on an associated signal wavelength using a first modulation format having a first spectral efficiency; at least one second modulation format transmitter configured to generate an associated second modulation format signal on an associated signal wavelength using a second modulation format having a second spectral efficiency higher than the first spectral efficiency. Each of the second modulation format signals has an optical power set nominally higher than the optical power of each of the first modulation format signals. At least one combiner is configured to combine the first and second modulation format signals to provide an aggregate output signal on an optical transmission path.

According to another aspect of the present disclosure there is provided a method including: generating at least one first modulation format signal on an associated signal wavelength using a first modulation format having a first spectral efficiency; generating at least one second modulation format signal on an associated signal wavelength using a second modulation format having a second spectral efficiency higher than the first spectral efficiency, each of the second modulation format signals having an optical power set nominally higher than the optical power of each of the first modulation format signals; and combining the at least one first modulation format signal and the at least one second modulation format signal into an aggregate signal on an optical transmission path.

It will be appreciated by those skilled in the art that any block diagrams herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection. As used herein, use of the term "nominal" or "nominally" when referring to an amount means a designated or theoretical amount that may vary from the actual amount.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A system comprising:
   a plurality of transmitters, each of the transmitters being configured to transmit an associated data channel wavelength separated by a defined channel-spacing from an adjacent one of the associated data channel wavelengths transmitted by another one of the plurality of transmitters;
   at least one of the plurality of transmitters being a first modulation format transmitter configured to generate an associated first modulation format signal on a first one of the associated data channel wavelengths using a first modulation format having a first spectral efficiency;
   at least one of the plurality of transmitters being a second modulation format transmitter configured to generate an associated second modulation format signal on a second one of the associated data channel wavelengths using a second modulation format having a second spectral efficiency higher than the first spectral efficiency, each of the second modulation format signals having an optical power set nominally higher than the optical power of each of the first modulation format signals; and at least one combiner configured to combine the first and second modulation format signals to provide an aggregate output signal on an optical transmission path.

2. The system of claim 1, wherein the optical power of the first modulation format signals and the optical power of the second modulation format signals are set to achieve nominally equal Q-factor performance of the first and second modulation format signals.

3. The system of claim 1, wherein the ratio of the number of the first modulation format signals to the number of the second modulation format signals is configured to achieve a desired aggregate spectral efficiency for the system.

4. The system of claim 1, wherein the associated data channel wavelengths associated with the first modulation format signals and the associated data channel wavelengths associated with the second modulation format signals are configured to spectrally interleave the first and second modulation format signals on an alternating channel-by-channel basis when the first and second modulation format signals are combined into the aggregate signal.

5. The system of claim 1, wherein the first and second modulation formats are multi-level modulation formats.

6. A method comprising:
providing a plurality of transmitters, each of the transmitters being configured to transmit an associated data channel wavelength separated by a defined channel-spacing from an adjacent one of the associated data channel wavelengths transmitted by another one of the plurality of transmitters;
generating at least one first modulation format signal on a first one of the associated signal wavelengths using a first modulation format having a first spectral efficiency;
generating at least one second modulation format signal on a second one of the associated data channel wavelengths using a second modulation format having a second spectral efficiency higher than the first spectral efficiency, each of the second modulation format signals having an optical power set nominally higher than the optical power of each of the first modulation format signals; and
combining the at least one first modulation format signal and the at least one second modulation format signal into an aggregate signal on an optical transmission path.

7. The method of claim 6, wherein the generating at least one first modulation format signal and the generating at least one second modulation format signal comprises:
setting the optical power of the at least one first modulation format signal and the optical power of the at least one second modulation format signal, respectively, to achieve nominally equal Q-factor performance of the at least one first and second modulation format signals.

8. The method of claim 6, the method further comprising:
selecting a ratio of the number of the first modulation format signals to the number of the second modulation format signals to achieve a desired aggregate spectral efficiency.

9. The method of claim 6, the method further comprising:
selecting the associated data channel wavelengths associated with the first modulation format signals and the second modulation format signals to spectrally interleave the first and second modulation format signals on an alternating channel-by-channel basis when the first and second modulation format signals are combined into the aggregate signal.

10. The method of claim 6, wherein the first and second modulation formats are multi-level modulation formats.

* * * * *